United States Patent [19]

McDonald et al.

[11] Patent Number: 4,632,667
[45] Date of Patent: Dec. 30, 1986

[54] ENCODING MEANS AND METHOD FOR A BAG MAKING APPARATUS

[75] Inventors: James A. McDonald, Palos Heights, Ill.; David E. Gledhill, Glastonbury, Conn.; Peter P. Savich, Longmeadow, Mass.

[73] Assignee: Union Carbide Corporation, Danbury, Conn.

[21] Appl. No.: 675,277

[22] Filed: Nov. 27, 1984

[51] Int. Cl.⁴ .................... B31B 23/16; B31B 23/64; B31B 23/88
[52] U.S. Cl. ................................. 493/187; 493/188; 493/194; 493/203
[58] Field of Search .............. 493/187, 188, 194, 203, 493/205, 236; 156/515; 264/509; 214/571

[56] References Cited

U.S. PATENT DOCUMENTS

| | | |
|---|---|---|
| 1,159,276 | 11/1915 | Rose .................................. 493/188 |
| 3,004,881 | 10/1961 | Van Der Meulen . |
| 3,072,961 | 1/1963 | Gilbert .............................. 264/509 |
| 3,115,072 | 12/1963 | Kaplan et al. . |
| 3,381,550 | 5/1968 | Smith . |
| 3,581,629 | 6/1971 | Wiendieck . |
| 3,836,614 | 9/1974 | Neugroschl . |
| 3,889,447 | 6/1975 | Garris . |
| 4,198,259 | 4/1980 | Van Der Meulen . |
| 4,464,219 | 8/1984 | Colombo et al. . |

Primary Examiner—Francis S. Husar
Assistant Examiner—William E. Terrell
Attorney, Agent, or Firm—Dominic J. Terminello

[57] ABSTRACT

A system for identifying the origin of a plastic bag made from web stock on a machine having a plurality of bag making stations wherein each station has a vacuum port for holding the web stock to the station during the bag making operation and each vacuum port has an identifying characteristic which is impressed in the web stock to identify the work station.

10 Claims, 5 Drawing Figures

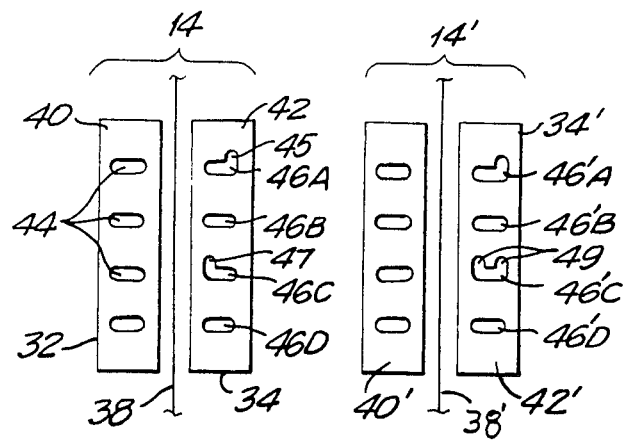
FIG. 3
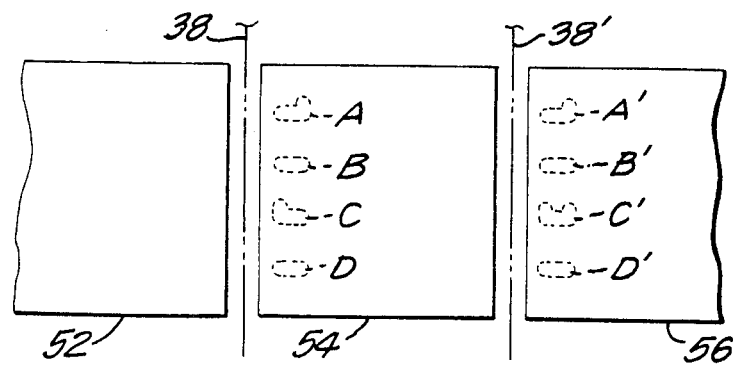
FIG. 4
| = 0    ] = 1    ⌐] = 2    ⌐]⌐ = 3
⌐] = 4    ⌐ = 5    [⌐ = 6    ⌐]⌐ = 7
I = 8    ] = 9
FIG. 5

ENCODING MEANS AND METHOD FOR A BAG MAKING APPARATUS

BACKGROUND OF INVENTION

The present invention relates to bag making machines, and more particularly to a method and apparatus for imparting an identifying code to each bag made by the machine.

Certain bags, such as plastic bags and the like, are made at the rate of hundreds per minute on a bag making machine which has a plurality of identical bag making stations. Each station of the machine produces a bag, so it is important to be able to identify a station which is producing a defective bag. Accordingly, it is the principle object of the present invention to provide a system for coding each bag so that, by inspection of the bag, the station at which it was made can be readily identified. Moreover, it is an object to provide such a system wherein the code imparted to the bag does not detract from the appearance of the bag, and preferably, is obvious only to a trained eye.

The present invention is particularly useful in rotary bag making machines, wherein a plurality of bag making work stations are arranged about the periphery of a rotating drum. In such apparatus, a clamp means is provided which tracks the rotation of the drum and holds the bag material to the surface of the drum while the bag making operations are performed. Breakdowns or machine failures of either the clamping means or of a work station, is reflected in a defective bag. It is equally important, therefore, to identify not only the work station at which the defective bag is made, but also to identify the particular clamp means associated with that work station at the time the bag is made. Accordingly, another object of the present invention is to provide an encoding system which codes each bag with identifying indicia representative of both the work station at which the bag is made and the clamp means associated with that work station when the bag is made.

SUMMARY OF THE INVENTION

The encoding system of the present invention may be characterized in one aspect thereof by:

(a) a plurality of equally spaced apart bag making work stations arranged for moving along a path of travel, each work station including a pair of adjacent web receiving surfaces, and heated means moveable from between the adjacent surfaces and against and at least partly through the web for severing and sealing the web to form an edge of the bag;

(b) clamp means associated with each work station to clamp the web to the surfaces prior to the movement of the heated means from between the adjacent surfaces, and the number of clamp means being limited such that only a certain few of the clamp means are assocated with any particular work station; and (c) at least one of the surfaces of each work station having a port for holding the web to the surface when a vacuum source is applied to the port, and the opening of the port through the surface has a characteristic shape which is different at each work station, and the characteristic shape being transferrable to, and permanently impressed in, the web when a vacuum source is applied to the port, thereby providing each bag formed by the machine with an impression indicative of both the particular work station which formed an edge of the bag and the certain few of the clamp means associated with that particular work station where the edge was formed.

In its method aspect the present invention can be characterized by a method of identifying the work station origin of a plastic bag made from a web of thermoplastic material supplied to a machine having a plurality of identical bag making work stations equally spaced about the periphery of a rotating cylinder, each work station including a vacuum port for holding the web to the work station during a series of bag making operations, the method comprising the steps of:

(a) providing the vacuum ports each with an identifiable characteristic that is different for each work station; and (b) impressing the characteristic into the web during the making of the bag by virtue of the holding of the web against the work station during the bag making operations.

DESCRIPTION OF THE DRAWINGS

FIG. 3 is a plan view on a smaller scale of the work stations;

FIG. 4 is a view showing a whole bag and portions of finished bags made at the FIG. 3 work stations; and FIG. 5 is illustrative of one form of an identifying code sequence.

DESCRIPTION OF THE PREFERRED EMBODIMENT

Figure 1:
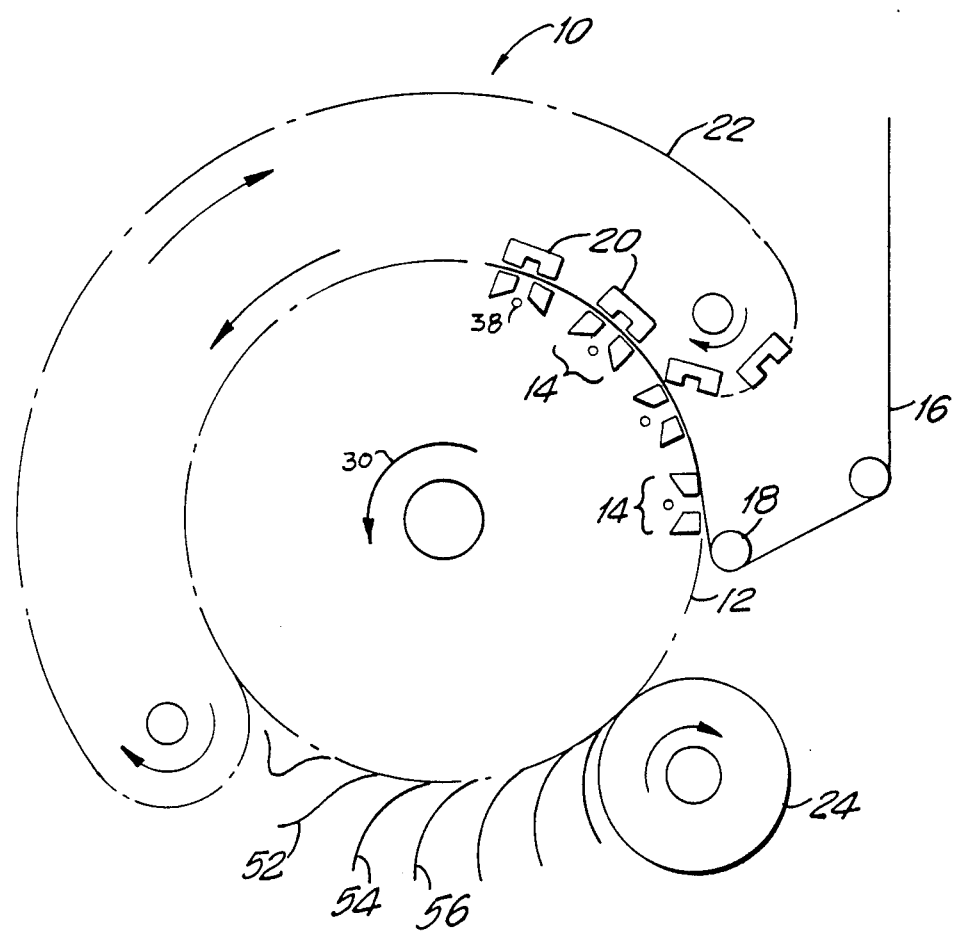
FIG. 1 is a schematic view showing in side elevation, a typical rotary bag making machine.

Referring the the drawings, FIG. 1 shows the schematic representation of a bag making apparatus generally indicated at 10. The apparatus includes a rotating cylinder 12 having a plurality of bag making work stations 14 spaced about the periphery of the cylinder and extending across the cylinder parallel to the axis of rotation.

As the cylinder rotates, a continuous web 16 of a thermoplastic material is laid onto its periphery. This web passes over a system of rollers including a lay-on roll 18 which feeds the web onto the periphery of the rotating cylinder. Web 16, before it reaches the bag machine, preferably is folded longitudinally to form a two ply web wherein each ply will eventually form a side of a bag.

A plurality of clamp assemblies 20, carried by an endless chain 22 serve to hold the web to the periphery of the cylinder.

As shown in FIG. 1, endless chain 22 is disposed and arranged so that clamp assemblies 20 can track the path of travel of work stations 14 during an arc segment of the rotation. The bag making operations are performed while the clamp assemblies are rotating with the work stations through this arc segment.

After a bag is formed and the clamp assemblies leave the work stations, the individual bags as identified for example at 52, 54 and 56 are held to the periphery of the cylinder, as further set out hereinbelow, until they are transferred to a take-off drum 24. Drum 24 removes the bags from the periphery in a known manner and delivers the bags to a packaging system (not shown).

Figure 2:
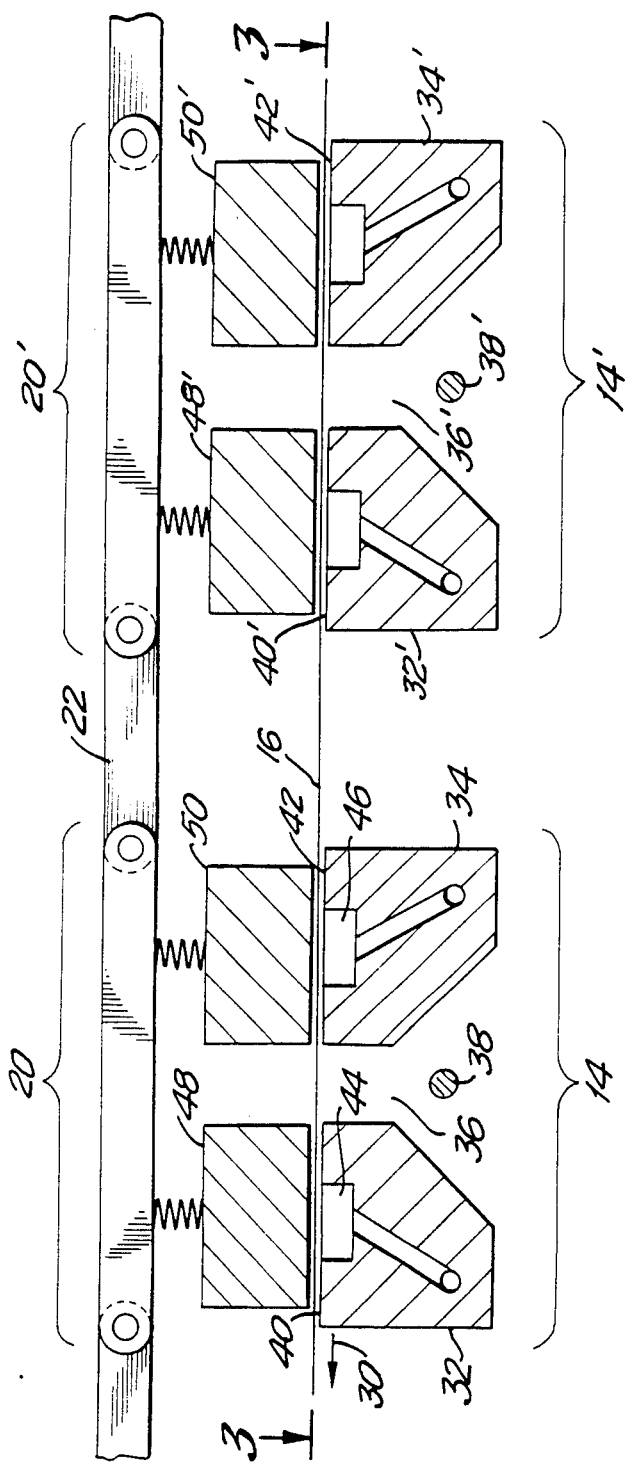
FIG. 2 is a view showing a pair of typical work stations of the bag making machine on an enlarged scale.

Two adjacent work stations 14 and 14' are shown in FIG. 2. Since the work stations are identical, only station 14 is described in detail, it being appreciated that the elements of work station 14' are identified with the same reference numerals. For purposes of orientation, it should be appreciated that the cylinder 12 of FIG. 1 rotates counter-clockwise so that the movement of the work stations as shown in FIG. 2 would be through a path of travel extending from right to left and in the direction as indicated by arrow 30.

Each work station includes a pair of spaced sealing bars 32, 34. Sealing bar 32 leads in the direction of rotation and bar 34 trails in the direction of rotation. These bars extend across the surface of the cylinder and are oriented parallel to the cylinder axis of rotation.

Between the bars is a space 36 known in the art as a "canyon". Disposed within the canyon 36 is a hot wire or other appropriate heating means 38. The hot wire is mounted for movement upwards and through this canyon as is known in the art in order to sever and seal the web.

Each sealing bar 32, 34 has a surface 40, 42 respectively. These surfaces receive the web 16 which is laid onto the periphery of cylinder 12 by lay-on roller 18 (FIG. 1). Opening through each surface 40, 42 is at least one, and preferably a plurality, of ports 44, 46. These ports, as known in the art, can be connected to an appropriate vacuum source (not shown) for purposes of holding the web 16 against the work station surfaces 40, 42.

Associated with each work station is a clamp assembly generally indicated at 20. Each clamp assembly includes a pair of clamp bars 48, 50 which are biased towards the work station for purposes of clamping the web 16 to the work station surfaces 40, 42. The clamp assemblies 20 are carried by an endless chain 22, only a portion of which is shown in FIG. 2. This endless chain, as best seen in FIG. 1, moves through a path of travel which corresponds in part to the path traveled by the work stations 14 on the periphery of cylinder 12. This allows the clamp bars 48, 50 to track the travel of the work stations and to clamp web 16 to the work station surfaces 40, 42 as the bag making operations are performed.

To make a bag, the web 16 is laid onto the periphery of rotating cylinder 12 at the lay-on roll 18. Just downstream of lay-on roll 18 the clamp assemblies 20 come into registry with, and begin tracking the movement of, work stations 14. At some point prior to the operation of sealing wire 38, each clamp assembly is moved towards the work station so that clamp bars 48, 50 clamp the web to the surfaces 40, 42.

As the work station and clamp assemblies continue to move in concert, the sealing wire 38 is driven upwardly through canyon 36 and against and through web 16. This severs and seals the two plies of the web, thereby forming the trailing edge of a first bag and the leading edge of a second bag. The trailing edge of the second bag is formed at the adjacent work station 14' by the sealing wire 38'. Accordingly the side-to-side dimension of the second bag is defined by the distance between the adjacent work stations 14, 14' and more particularly is substantially defined by the distance between the sealing wires 38, 38' at these stations. If desired, this side-to-side dimension can be increased by folding or tucking the web between the adjacent workstations. After the web is severed, a vacuum source (not shown) is applied to ports 44, 46 to hold the severed web to the work station surfaces 40, 42.

When the bag making operations have been completed, clamp assemblies 20 eventually leave the periphery of the rotating cylinder and are carried by endless chain 22 back to the point of beginning downstream of lay-on roll 18. Also after the bag making procedures are complete, the vacuum source is removed from the vacuum ports in one of the sealing bars. Preferably, the vacuum source is removed from ports 44 in sealing bar 32 which leads in the direction of movement. Maintaining the vacuum on the ports 46 of the sealing bar 34 which trails in the direction of travel, holds the leading edge of the bag to the periphery of the rotating cylinder and allows the trailing edge of the bag to swing free of the cylinder periphery as shown in FIG. 1, so that the bags can be picked up by the takeoff drum 24 and moved to a bag packaging system (not shown).

There are several critical factors which determine the quality of the seal made at each work station and therefore the quality of the side edges of the bags. These factors include, for example, the temperature and the physical characteristics of the sealing wires 38. If the hot wire is damaged the seal may be defective. If the hot wire breaks, no seal will be formed. Also, the seal may be defective if the temperature of the hot wire is not within a temperature range suitable for severing and sealing the web. Damage to either of the surfaces 40, 42 or to the clamp bars 48, 50 may result in a disfigurement of the bag. A further critical feature is the alignment of the clamp bars with the sealing bars. In this respect, if the clamp bars and sealing surfaces are not properly aligned the integrity and the appearance of the side edges of the bag may be affected.

Accordingly, when a defective bag is discovered, it is important to identify where on the machine the bag was made and more particularly, to identify which of the plurality of work stations and clamp assemblies were involved in the manufacture of the defective bags.

In the present invention this identification is accomplished in the following manner. First the number of work stations 14 and clamp assemblies 20 are slected so that only certain of the clamp assemblies track the movement of any particular work station. This can be accomplished, for example, by having an equal number of work station sand clamp assemblies. However, to facilitate operation of the bag making apparatus it is preferred that the number of clamp assemblies exceed the number of work stations. Accordingly, a numerical relationshp between the clamp assembly and work station must be maintained in order to assure that only the same one or more clamp assemblies are associated with the same work station.

One manner in which this can be accomplished is by having the ratio of the number of clamp assemblies to the number of work stations, be a whole number. Thus, if there are two or three times as many clamp assemblies as work stations, the same two or three clamp assemblies will always associate with any particular workstation. While other ratios will work to identify the certain clamp assemblies associated with any particular work station, increasing the ratio increases the number of clamp assemblies which must be inspected in order to find the defective one.

In addition, each of the work stations is provided with an identifying characteristic which is transferred to the bag when the edge of the bag is formed. The identifying characteristic at the work station should not be in the form of a raised projection on either the surfaces 40, 42 or the associated surfaces of the clamp bars 20. This is because a raised projection will prevent uniform clamping. Also, it is preferred that these surfaces be smooth so as not to damage the web. Accordingly, in the invention, the identifying characteristic is provided by the configuration of the opening of ports 46 through surface 42.

When the vacuum source is applied to the ports to draw web 16 against surface 42, the configuration of each port is impressed into the web. As set out hereinabove, the vacuum at ports 46 is maintained for a longer period than the vacuum at ports 44. Accordingly, the impression of vacuum ports 46 into the bag along the leading edge of the bag is more pronounced than the impression of ports 44 along the trailing edge of the bag. Also, the sealing bars 32, 34 become heated by conduction and convection during the operation of the machine and this assists in impressing the configuration of ports 46 along the edge of the bag. Thus by subjecting the portion of the thermoplastic web overlying ports 46 to pressure and heat, the material is caused to take a permanent set which impresses a line of demarcation in the material. This line defines an enclosed area having an outline corresponding to the profile of the vacuum port at the work station surface 42.

The ports 46 have a different configuration for each work station so that the configuration of each port, when impressed into the bag, can serve as a code means to identify the particular work station at which the bag was formed. Moreover, since only certain ones of the clamp assemblies 20 are associated with any particular work station, the identification of the work station also will serve to identify those certain few clamp assemblies that could be involved in the manufacture of the bag.

In FIG. 3 the two adjacent work stations 14, 14' are shown in plan view to illustrate the configuration of the vacuum ports which open through the surfaces 40, 42 of each sealing bar 32, 34. As shown in FIG. 3, there are a plurality of vacuum ports 44, 46 in each sealing bar. Only the vacuum ports 46 in the trailing sealing bar 34 of each work station have the distinctive profile. While the vacuum ports can have any distinctive profile, the arrangement, as illustrated, uses vacuum ports which are slightly elongated. The distinctive characteristic is provided by having one or more portions of each elongated vacuum port provided with a distinctive profile.

By way of illustration FIG. 3 shows that sealing bar 34 has four vacuum ports 46A-D. Ports 46B and 46D have no distinctive characteristics. However, port 46A has an enlarged portion 45 at one end. Port 46C has a similar enlarged portion 47 but it is distinctive in that it lies at an end of elongated port 46C which is opposite to the enlarged end 45 of Port 46A. In contrast the ports 44 of sealing bar 32 are identical and have no distinctive characteristics.

In the adjacent work station 14' the sealing bar 34' likewise has four ports 46'A-D. In order to distinguish work station 14 from work station 14' port 46C has an enlarged or rounded portion 49 at each end of the elongated port.

FIG. 4 shows a whole bag 54, and the portions of two adjacent bags 52 and 56 which have side edges made at the work stations 14, 14' of FIGS. 2 and 3. The hot wires 38 and 38' are shown in phantom line for purposes of orientation. The demarcation lines impressed along an edge of each bag 54, 56 is shown at A-D and A'-D'. These impressions are represented by dotted lines because they are not in sharp contrast to the bag and would be unnoticeable except to a trained eye.

By inspecting bag 54 (FIG. 4) one can tell it was made at a different work station in comparison to bag 56. This is because the configuration of the enclosed areas defined by lines A-D impressed by port 46 in bag 64 are different from lines A'-D' impressed by ports 46' in bag 56. In particular compare the configuration of C with that of C'.

Since there are a plurality of vacuum ports in each of the sealing bars, each bag can be encoded with a variety of information. For example, one port can be used to identify the location of the machine. If there are several machines at any particular facility making these plastic bags, another port can be used to identify a particular machine at that location. If each machine has more than one lane for making the bag, still another port can be used to identify the particular lane of the machine in which the bag was made. The remaining vacuum ports may be used to identify the particular work station at which the bag was made.

FIG. 5 illustrates one possible code and configuration of the elongated vacuum slots representative of the numbers 0 through 9. In this code the configuration of the slots somewhat resembles the arabic numeral equivalent. With such a code and using only two vacuum ports for work station identification, it should be appreciated that the code can be used to identify up to 100 individual work stations.

Thus, it should be appreciated that the present invention provides a system for coding plastic bags in order to provide the bags with an identifying characteristic representative of the particular work station at which the bag was made. The identifying characteristic is provided without compromising the smooth unbroken surfaces between which the web 16 is clamped prior to severing or sealing the web. Instead, the identifying characteristic is impressed into the web material by an existing machine component which has a primary function which is not that of impressing a code in the bags. The vacuum ports, as described hereinabove, possess the identifying code characteristic (the configuration of the vacuum port at the surface through which the ports open) but their primary function is to hold the web against the work station surface.

The system of the present invention not only provides for identification of the particular work station at which the bag was made, but it also provides for identifying the associated clamp means. This is accomplished by an arrangement of clamp means such that only certain of the clamp means are associated with any particular one of the work stations. It is also important to note that the identifying code does not perforate or damage the integrity of the bag but leaves the bag surface intact. Since the impression of the code is not readily apparent to an untrained eye, the impression does not detract from the bag appearance.

It should be appreciated that the impressions left by the vacuum port can be made more or less pronounced as desired. For example, depending upon the material and thickness of the web and the temperature of the work station surfaces, the area of the vacuum ports and the amount of vacuum can be altered to increase or decrease the sharpness of the impression.

Having thus described the invention in detail what is claimed as new is:

1. A machine for making bags from a web of thermoplastic material, said machine comprising:
   a. a plurality of equally spaced work stations, each work station including a pair of adjacent web receiving surfaces extending traverse to the web;

b. clamp means associated with each work station and movable towards said web receiving surfaces for clamping the web to said web receiving surfaces;

c. heated means between said adjacent web receiving surfaces at each work station for severing and sealing the web to form a bag edge;

d. at least one of said adjacent web receiving surfaces at each work station having a vacuum port adapted to be connected to a vacuum source for holding the web to said at least one web receiving surface at each work station; and e. code impressing means at each of said work stations for making a permanent impression in each bag formed by said machine indicative of a particular work station at which an edge of the bag is formed, said code impressing means comprising said vacuum ports, each of said vacuum ports having a characteristic configuration at said web receiving surface which differentiates said work stations one from another, and said vacuum port characteristic configuration is impressed in the web held by said vacuum ports against said web receiving surfaces.

2. A machine as in claim 1 wherein said work stations are moveable along a path of travel, said web receiving surfaces extend traverse to the direction of travel of said work stations and said vacuum port is on said web receiving surface which trails in the direction of travel of said work stations.

3. A machine as in claim 2 wherein said clamp means are arranged for movement through a closed path of travel only a portion of which follows the path of travel of said work stations, and the number of said clamp means being a whole number ratio to the number of said work stations so that only a certain plurality of said clamp means are associated with any particular one of said work stations, whereby said impression made by said code impressing means is also indicative of said certain plurality of clamp means associated with said particular work station.

4. An encoding system as in claim 1 including at least one vacuum port in each of said web receiving surfaces wherein only one of said surfaces contains a vacuum port having said characteristic configuration.

5. An encoding system as in claim 1 wherein said vacuum ports are elongated slots and said characteristic configuration is formed by an enlargement of the slot width at some point along the slot length.

6. A bag making machine for making plastic bags from a two-ply web of thermoplastic material comprising:

a. a rotatable cylinder b. a purality of identical bag making work stations equally spaced about said cylinder, each of said work stations having a pair of surfaces extending parallel to the rotational axis of said cylinder for receiving a web laid onto said surfaces and which surfaces together define the periphery of said cylinder;

c. means at each of said work stations for severing and sealing the thermoplastic web supplied to the machine and laid onto said web receiving surfaces;

d. at least one of said web receiving surfaces at each of said work stations having a plurality of vacuum ports for holding the web to said web receiving surfaces, said vacuum ports having a configuration which defines a code that differentiates each of said work stations one from another; and e. said vacuum ports comprising code impressing means for impressing said code in the web held against said web receiving surfaces, thereby providing each bag made by the machine with a code impression which is an indicant of only a particular one of said work stations.

7. A bag making machine as in claim 6 including clamp means associated with said work stations and arranged for movement through a closed path of travel which tracks the rotation of the bag making work stations for a segment of the rotation, and said clamp means being movable towards said work stations within said segment for clamping the web to said web receiving surfaces, and the ratio of the number of said clamp means to the number of said work stations being a whole number so that a limited certain few of said clamp means are associated with any particular work station, whereby said code impression left by said vacuum ports is an indicant of only a particular one of said stations and the certain few of said clamp means associated with that particular one of said stations.

8. An encoding system as in claim 7 wherein said vacuum ports are parallel elongated slots and said code identification is provided by an enlargement of a portion of one or more of said elongated slots.

9. A bag making method comprising the steps of:

a. providing a bag making machine with a rotatable cylinder having a plurality of work stations equally spaced about the periphery of the cylinder, said work station each having a web receiving surface provided with at least one vacuum port and configuring said vacuum port so that each work station has a distinctive vacuum port configuration serving to differentiate one work station from another;

b. rotating said cylinder and, while rotating said cylinder, suppling a continuous web of thermoplastic material to said machine and laying said web onto said web receiving surfaces and over each of said vacuum ports;

c. drawing a vacuum at said vacuum ports for holding the web to said receiving surfaces and impressing thereby said distinctive vacuum port configuration in the web; and d. sever sealing the web at each work station to form a bag edge, whereby said impression is located adjacent one edge of each bag made by the machine.

10. A method as in claim 9 comprising the steps of;

a. moving a plurality of clamp means through a closed path of travel which tracks the rotation of the cylinder for a segment of the cylinder rotation and, in said segment of rotation, pressing the clamp means towards the work stations for clamping the web to the work stations during the bag making operations;

b. providing a number of said clamp means which is a whole number multiple of said work stations so that only a certain few of said clamp means are associated with any particular work station; and c. said impressing of the code configuration of the vacuum ports at step (c) of claim 19 operating to identify a certain few of said clamp means which are associated with a particular work station during the bag making operation.

* * * * *